(12) United States Patent
Ent et al.

(10) Patent No.: US 10,027,946 B2
(45) Date of Patent: Jul. 17, 2018

(54) CAMERA ASSEMBLY FOR ELECTRONIC DEVICES

(71) Applicant: Lenovo (Singapore) Pte. Ltd., New Tech Park (SG)

(72) Inventors: Ali Kathryn Ent, Garner, NC (US); Christopher Miles Osborne, Cary, NC (US); Cuong Huy Truong, Cary, NC (US); David Wayne Hill, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 167 days.

(21) Appl. No.: 14/969,552

(22) Filed: Dec. 15, 2015

(65) Prior Publication Data

US 2017/0171528 A1 Jun. 15, 2017

(51) Int. Cl.
*H04N 13/207* (2018.01)
*H04N 13/02* (2006.01)

(52) U.S. Cl.
CPC ... *H04N 13/0207* (2013.01); *H04N 2213/001* (2013.01)

(58) Field of Classification Search
None
See application file for complete search history.

(56) References Cited

U.S. PATENT DOCUMENTS

| | | | | |
|---|---|---|---|---|
| 2002/0196201 A1* | 12/2002 | Rosen | ........... | B60K 35/00 345/7 |
| 2007/0056231 A1* | 3/2007 | DiMario | ........... | B60J 1/00 52/204.53 |
| 2015/0018622 A1* | 1/2015 | Tesar | ........... | A61B 1/05 600/202 |
| 2016/0054761 A1* | 2/2016 | Wolff | ........... | E05D 7/10 361/679.09 |

* cited by examiner

*Primary Examiner* — Eileen M Adams
(74) *Attorney, Agent, or Firm* — Dean D. Small; The Small Patent Law Group, LLC

(57) ABSTRACT

In accordance with embodiments herein an electronic device is provided comprising a housing, a display, and a camera assembly including a camera and an articulating support that includes a base and a main leg joined to the base. The base and main leg movably coupled to the housing wherein movement of the articulating support defines camera alignment paths followed by the camera when moving between a retracted position and active positions.

21 Claims, 10 Drawing Sheets

CAMERA ASSEMBLY FOR ELECTRONIC DEVICES

BACKGROUND

Embodiments of the present disclosure generally relate to electronic devices that include camera assemblies, and more particularly camera similes that offer enhanced features.

In recent years, various types of electronic devices have been developed, such as personal computers, tablet devices, smart phones and the like. Modern electronic devices offer a variety of features, some of which utilize a camera that is built into the housing of the electronic device. A basic use of cameras, that are integrated into electronic devices, relate to the capture of still and video images of the user and surrounding environment, such as during a bidirectional audiovisual communication session (e.g. a FaceTime session, a videoconferencing session and the like). For example, conventional laptop computers position the integrated camera within a bezel surrounding the display. The camera is generally centered above the display in order to capture the user's image while watching the display or otherwise interacting through the laptop computer during an audiovisual communications session.

However, as technology advances, the form factor of electronic devices continues to be reduced. As the size of electronic devices is reduced, the real estate available for holding a camera becomes more challenging. For example, in laptop computers, as the computer's dimensions are reduced, the space within the bezel surrounding the display similarly is reduced. The reductions in real estate are not limited to the XY direction across the width and height of the device housing (or display part). In addition, the cameras located within the bezel have a relatively fixed field of view based upon the position and orientation of the computer display.

To further complicate the foregoing challenges, an ongoing demand exists to provide more enhanced features in electronic devices. Some enhanced features relate to enhanced camera functionality. By way of example, a demand exists for cameras that support enhanced feature cameras. One example of an enhanced feature camera is a three-dimensional (3D) camera that supports gesture detection and 3D scanning. The 3D camera or another type of camera with enhanced features may provide gaze detection, eye tracking, facial detection, iris authentication and the like. In order to take advantage of some enhanced features, it may be desirable to orient the camera in various positions and alignments. Cameras built into the bezel of a laptop computer or other electronic devices are not readily adjustable two different camera positions and alignments.

Also, cameras that offer enhanced features have a corresponding larger form factor, as compared to cameras with fewer features. The feature rich cameras utilize lenses, multiple sensors and other components that result in a bigger or thicker camera module, as compared to cameras with minimal features. Consequently, a difficulty exists in positioning feature rich cameras within electronic devices while still affording flexibility in the alignment in orientation of the camera.

A need remains for electronic devices having feature-rich cameras and methods of utilizing such electronic devices.

SUMMARY

In accordance with embodiments herein an electronic device is provided comprising a housing, a display, and a camera assembly including a camera and an articulating support that includes a base and a main leg joined to the base. The base and main leg are movably coupled to the housing such that the articulating support defines camera alignment paths followed by the camera when moving between a retracted position and active positions.

Optionally, the main leg is located at least partially behind the display when in the retracted position. The base is elongated along a base longitudinal axis and is held in a cavity provided in the housing. The base slides along a translation path, corresponding to the longitudinal axis, between a retract position within the cavity and an extended position projecting from the cavity. The translation path may represent one of the alignment paths.

The main leg is located proximate to a back wall of the housing when the base is in the retracted position within the cavity and the main leg is located laterally outward from an edge of the housing when the base is in the extended position. The display is positioned within and defines a display plane that includes the display and the display plane extending laterally beyond edges of the housing. The articulating support moves along a rotational path that traverses the display plane, the rotational path representing one of the alignment paths.

The articulating support further comprises an upper lever arm movably coupled to the main leg at a hinge that defines a pivot path having a range of motion that at least partially crosses in front of a front face of the display. The pivot path may represent one of the alignment paths. The pivot path rotates about a pivot axis extending along a length of the main leg. The hinge includes a multi-action hinge that rotates the lever arm relative to the main leg about the pivot path. The multi-action hinge tilts the camera about a swivel path, the swivel path rotation about a swivel axis that extends along a length of the extension arm, the swivel path representing one of the alignment paths.

The camera may represent a 3D camera. The electronic device further comprises memory and one or more processors coupled to the camera. The one or more processors executes program instructions stored in the memory to perform a 3D scanning operation of an object of interest in a field of view of the 3D camera. The electronic device further comprises memory and one or more processors coupled to the camera. The one or more processors execute program instructions stored in the memory to perform gesture detection of an object of interest in a field of view of the 3D camera.

The articulating support moves the camera between active positions that include one or more of: a birds eye view in which the main leg is oriented in a generally horizontal direction or approximately perpendicular relative to a front face of the display, a frontal scene view in which the main leg is oriented in a generally vertical or common direction with the front face of the display, or an intermediate position to provide an overview in which the main leg is oriented at an intermediate angle relative to the front face of the display.

In accordance with embodiments herein a method is provided comprising providing an electronic device with a camera assembly including a camera and an articulating support that includes a base and a main leg joined to the base. The method movably couples the base and main leg to the housing to define camera alignment paths followed by the camera when moving between a retracted position and active positions.

The method further comprises locating the main leg at least partially behind the display when in the retracted position. The base is elongated along a base longitudinal axis. The method further comprising holding the base in a cavity provided in the housing such that the base slides along a translation path, corresponding to the longitudinal axis, between a retract position within the cavity and an extended position projecting from the cavity, the translation path representing one of the alignment paths.

The method further comprises locating the main leg proximate to a back wall of the housing when the base is in the retracted position within the cavity and locating the main leg laterally outward from an edge of the housing when the base is in the extended position. Optionally, the method may move the articulating support along a rotational path that traverses a display plane defined by the display, the rotational path representing one of the alignment paths.

The method further comprises movably coupling an upper lever arm to the main leg to define a pivot path having a range of motion that at least partially crosses in front of a front face of the display, the pivot path representing one of the alignment paths, the pivot path rotating about a pivot axis extending along a length of the main leg.

The upper lever arm is coupled to the main leg in a manner that enables rotation of the lever arm relative to the main leg about the pivot path, and enables tilting the camera about a swivel path, the swivel path rotation about a swivel axis that extends along a length of the extension arm, the swivel path representing one of the alignment paths. The method may perform a 3D scanning operation of an object of interest in a field of view of the camera.

The camera alignment paths support movement of the camera between active positions that include one or more of: a birds eye view in which the main leg is oriented in a generally horizontal direction or approximately perpendicular relative to a front face of the display, a frontal scene view in which the main leg is oriented in a generally vertical or common direction with the front face of the display, an intermediate position to provide an overview in which the main leg is oriented at an intermediate angle relative to the front face of the display.

DETAILED DESCRIPTION

It will be readily understood that the components of the embodiments as generally described and illustrated in the FIGS. herein, may be arranged and designed in a wide variety of different configurations in addition to the described example embodiments. Thus, the following more detailed description of the example embodiments, as represented in the FIGS., is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
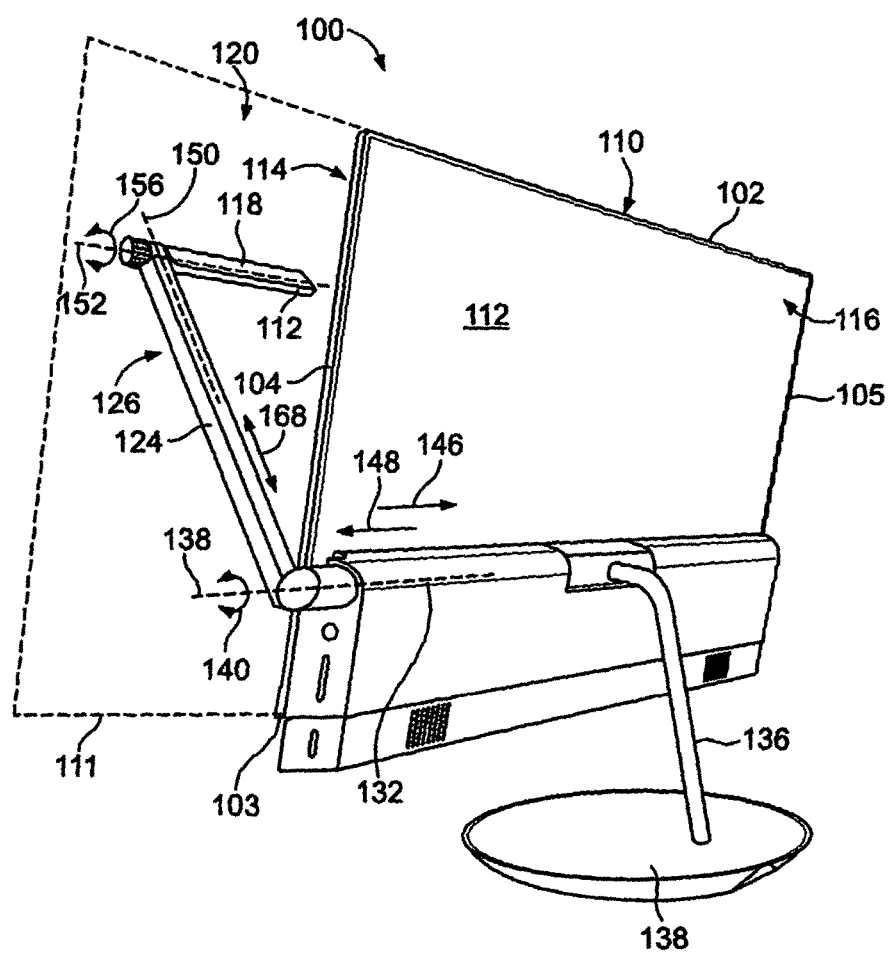
FIG. 1 illustrates a rear perspective view of an electronic device formed in accordance with an embodiment herein.

FIG. 1 illustrates a rear perspective view of an electronic device 100 formed in accordance with an embodiment herein. The electronic device may simply represent a monitor or display device for a computer, television or other device. Optionally, the electronic device may represent a computer, tablet device, phone TV and the like. The electronic device 100 includes a camera assembly 120 and a display 110. The display 110 includes a housing 112 having a front face 114 and a back wall 116. The housing 112 is secured to a support stand 136 having a footing 139. Optionally, the housing 112 may be provided in connection with, or integrated into, various electronic devices, such as a laptop computer, tablet device, telephone, television, printer and the like. The camera assembly 120 may be provided with alternative types of electronic devices, additional examples of which are described herein and are well known.

The camera assembly 120 is movably mounted to the housing 112. The camera assembly 120 includes an articulating support 126 that retains a camera 118 and enables the camera 118 to be translated and rotated relative to the display 110 in multiple paths and about multiple axes. The articulating support 126 is movable between a retracted position and an active position, where the retracted position is located at least partially behind the display 110. As explained herein, the articulating support 126 enables the user to pull the articulating support 126 from behind the display 110 and rotate it forward to position the camera 118 at a desired positions and orientations in connection with various operations, such as 3-D scanning, document photography, desktop photography, gesture detection, videoconferencing and the like. The articulating support 126 includes a base 122 (FIG. 3A), a main leg 124 and an upper lever arm 128 (FIG. 4). The base 122 is joined to one end of the main leg 124. An opposite end of the main leg 124 is movably coupled to the upper lever arm 128. The base 122, main leg 124 and lever arm 128 are joined to one another and movably coupled to the housing 112 such that the articulating support 126 defines camera alignment paths followed by the camera 118 when moved between a retracted position and various active positions. The articulating support 126 holds the camera 118 at a desired active position once the user positions the camera 118 as desired.

The housing 112 includes a base retention bracket 132 that receives, and supports translation and rotation of, the base 122. In the example of FIG. 1, the base retention bracket 132 is provided on the back wall 116 of the housing 112. The base retention bracket 132 may be formed integral with or separately from the housing 112. Optionally, the base retention bracket 132 may be positioned at other locations upon the housing 112, such as along upper, lower or side edges 102-105 of the housing 112. Optionally, the base retention bracket 132 may be provided on the support stand 136.

The camera assembly 120 enables the camera 118 to be adjusted along camera alignment paths in numerous directions about various, rotational, pivotal and translational paths. Examples of the camera alignment paths include lateral translation paths such as an inward path 146, an outward path 148, a rotational path 140, a pivot path 154, a swivel path 156, an extension path 168 and the like. In accordance with some embodiments, the main leg 124 is located at least partially behind the display 110 when in the retracted position. In accordance with at least one embodiment, the base 122 extends along, and defines, a base longitudinal axis 138. The base 122 is rotatable about the base longitudinal axis 138 along a rotational path 140, and is translatable along the base longitudinal axis 138 when following the inward path 146 and outward path 148. The main leg 124 extends along a leg longitudinal axis 150, while the upper lever arm 128 extends along an arm longitudinal axis 152. The upper lever arm 128 is coupled to the main leg 124 in a manner such that the upper lever arm 128 is able to turn to face in different directions about pivot path 154. The upper lever arm 128 is also able to be tilted along a swivel path 156. The display 110 is positioned within and defines a display plane 111 (denoted in dashed lines in FIG. 1) that includes the display 110. The display plane 111 extends laterally beyond the edges of the housing 112. The articulating support 126 moves along the rotational path 140 that intersects and traverses the display plane 111.

In the example of FIG. 1, the main leg 124 is formed as a single unit with a predetermined fixed length. Optionally, the main leg 124 may be formed as a multi-piece telescoping arm that extends and contracts along the longitudinal axis 150, thereby providing a camera alignment path that represents the extension path 168. The use of a telescoping arm allows the user to adjust the camera 118 upward and downward to select heights relative to the display 110, a user, and a workspace.

Figure 2A:
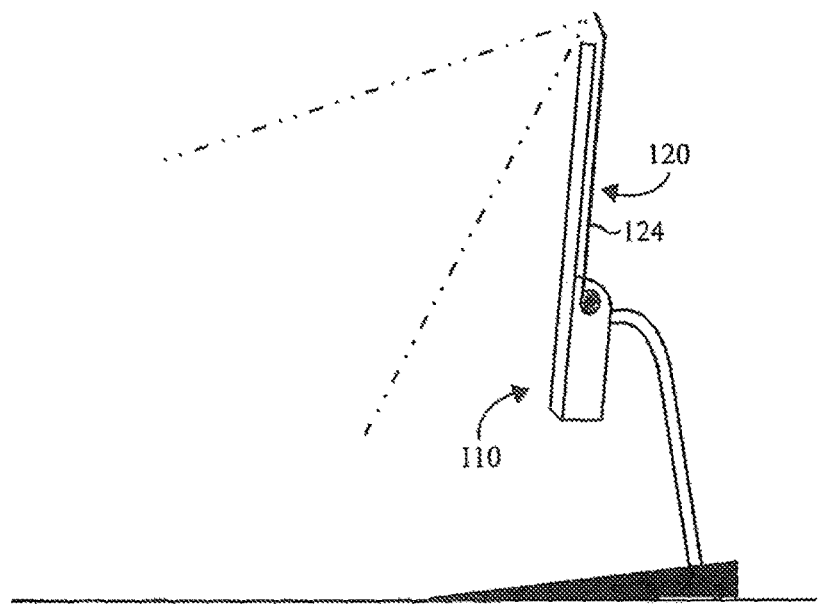
FIG. 2A illustrates side plan views of the camera assembly while in different active positions relative to the display in accordance with embodiments herein.
Figure 2B:
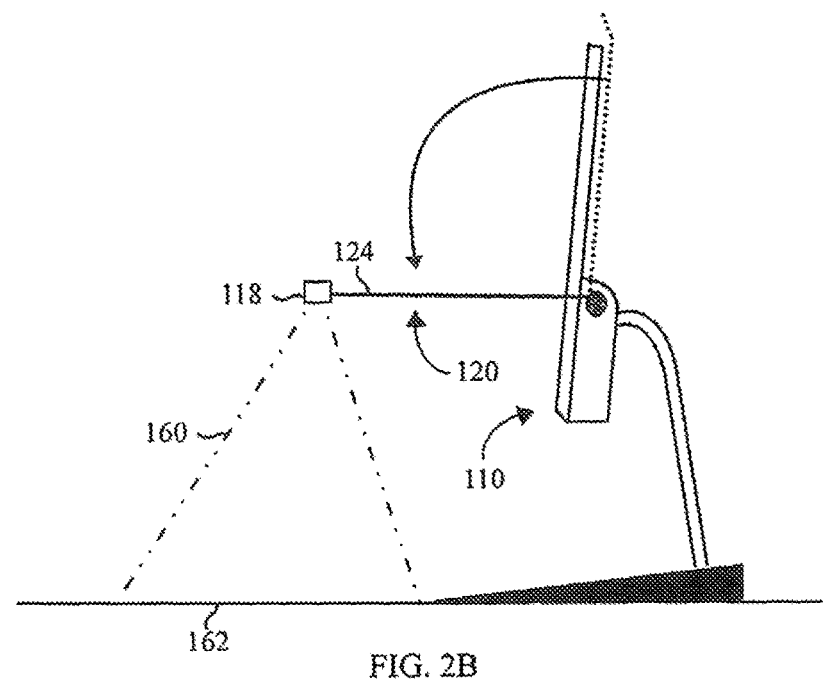
FIG. 2B illustrates side plan views of the camera assembly while in different active positions relative to the display in accordance with embodiments herein.
Figure 2C:
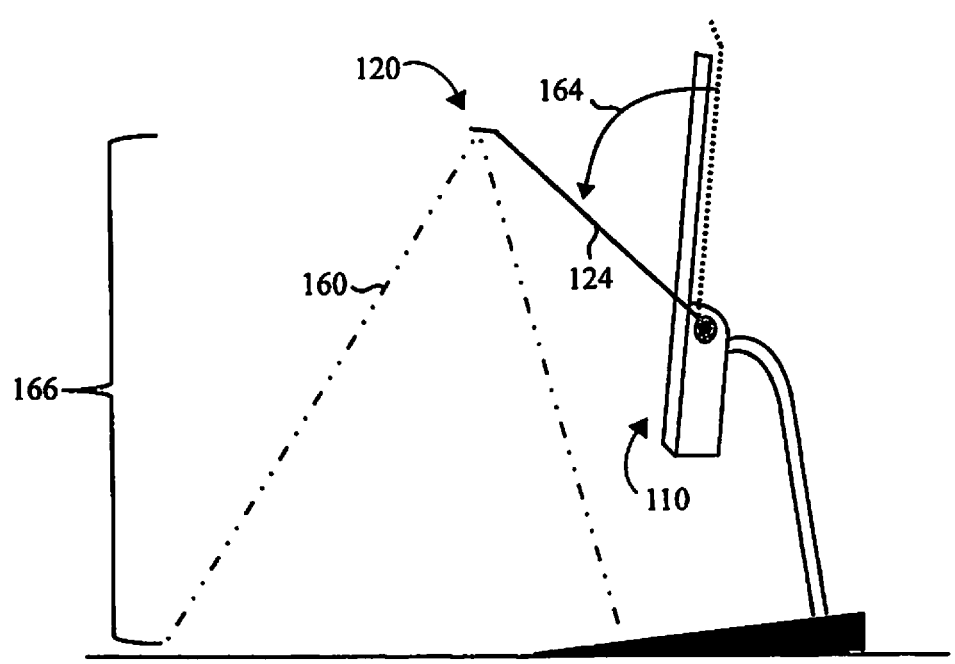
FIG. 2C illustrates side plan views of the camera assembly while in different active positions relative to the display in accordance with embodiments herein.

FIGS. 2A-2C illustrates side plan views of the camera assembly 120 while in different active positions relative to the display 110 (more specifically, relative to a plane of the front face 114 of the display 110). FIG. 2A illustrates the camera assembly 120 while positioned to provide a frontal scene view in which the main leg 124 is oriented in a generally vertical or common direction with the plane of the display 110. FIG. 2B illustrates the camera assembly 120 while rotated and pointed downward to provide a birds eye view in which the main leg 124 is oriented in a generally horizontal direction or approximately perpendicular (e.g. 85° to 110°) relative to the display 110. While positioned downward, the camera 118 is oriented such that the field of view 160 faces downward onto a work surface 162 proximate to the display 110. By way of example only, the field of view 160 may be oriented to face the work surface 162 such as in connection with gesture detection and/or three-dimensional scanning of objects, documents, the keyboard, a user's hands and other items located on the work surface 162.

FIG. 2C illustrates the camera assembly 120 while positioned at an intermediate position to provide an overview in which the main leg 124 is oriented at an intermediate angle 164 (e.g. 5° to 85°) relative to the display 110. The camera 118 is tilted to direct the field of view 160 onto the work surface 162, but from a greater height 166, as compared to the birds eye view of FIG. 2B. It is recognized that the views and positions illustrated in FIGS. 2A-2C are only examples and that the camera assembly 120 may be positioned in numerous other orientations and positions.

Figure 3B:
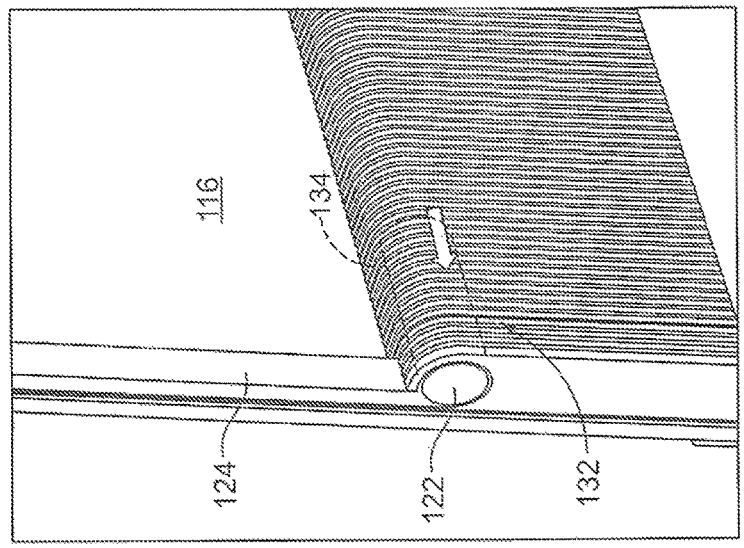
FIG. 3B illustrates perspective views of the interconnection of the base and main leg in more detail in accordance with an embodiment herein.
Figure 3A:
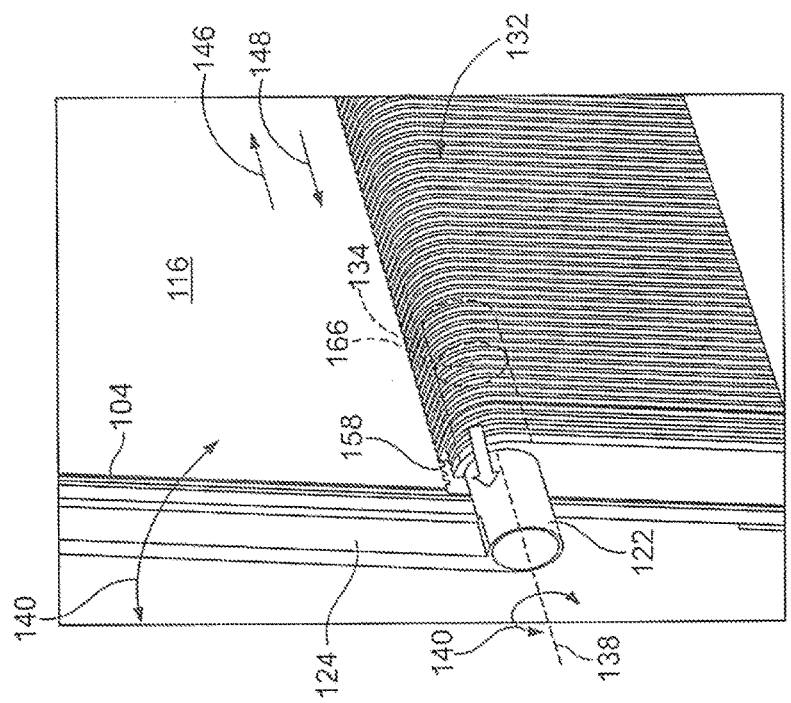
FIG. 3A illustrates perspective views of the interconnection of the base and main leg in more detail in accordance with an embodiment herein.
Figure 4:
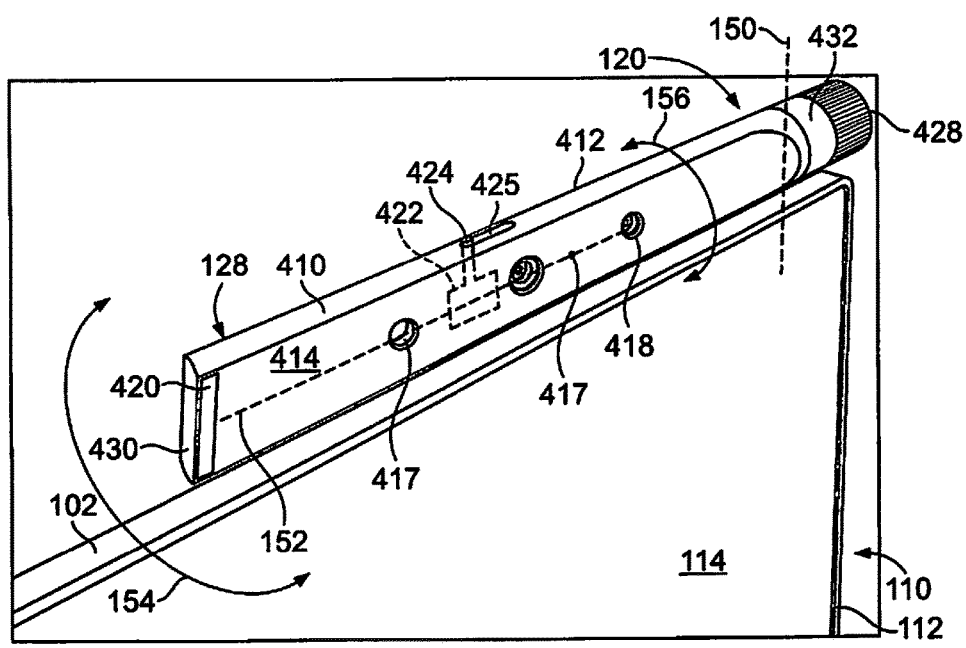
FIG. 4 illustrates a perspective view of the upper lever arm formed in accordance with embodiments herein.

FIGS. 3A and 3B illustrate perspective views of the interconnection of the base 122 and main leg 124 in more detail in accordance with an embodiment herein. The retention bracket 132 includes an open ended tubular cavity 134 that is shaped and dimensioned to receive the base 122. The base 122 is tubular in shape and extends along the longitudinal axis 138. As illustrated in FIG. 3A, the retention bracket 132 includes a notched opening 158 that forms a gap between the retention bracket 132 and back wall 116 the display 110 (FIG. 1). When not in use, the main leg 124 is rotated to align with the notched opening 158 and the base 122 is translated along the inward path 146 until the main leg 124 fits into the notched opening 158. FIG. 3B illustrates the main leg 124 as positioned in the notched opening 158 and with the base 122 fully retracted into the cavity 134. The main leg 124 is located proximate to the back wall 116 of the housing 112 when the base 122 is in the retracted position within the cavity 134.

To move the main leg 124 from the retracted position to one of various active positions, the base 122 slides along a translation path corresponding to the longitudinal axis 138, between the retracted position (FIG. 3B) within the cavity 134 and an extended position projecting from the cavity 134. The translation path represents one of the alignment paths. In the example of FIG. 3A, the base 122 slides along the outward path 148 until the main leg 124 clears (e.g. extends laterally outward beyond) the notched opening 158 and the side edge 104 of the display 110. When the main leg 124 is positioned laterally outward beyond the side edge 115, the main leg 124 may then be rotated about the rotational path 140.

Optionally, a push push spring device 166 may be located within the cavity 134 and engage an interior end of the base 122 to facilitate movement of the main leg 124 out of the notched opening 158. For example, the push push spring device 166 may operate such that when a user pushes a first time on the base 122 along the inward path 146, the spring device 166 retains the main leg 124 within the notched opening 158. When the user pushes a second time on the base 122, the spring within the spring device 166 applies a force along the outward path 148 upon the base 122 to force the main leg 124 out of the notched opening 158.

FIG. 4 illustrates a perspective view of the upper lever arm 128 formed in accordance with embodiments herein. The lever arm 128 in FIG. 4 is located proximate to an upper edge 102 of the display 110, with the camera 118 field of view oriented to face in a common direction as the front face 114 of the display 110. For example, the camera 118 may be positioned in a stationary location above the display 110, such as in connection with affording a desired viewing angle during videoconferencing and other operations. While not shown in FIG. 4, the main leg 124 (FIG. 1) of the camera assembly 120 is positioned behind the housing 112 proximate to the rear wall of the housing 112 in the retracted position. As shown in FIG. 4, even though the articulating support 120 is in the retracted position, the camera 118 is still functional.

The lever arm 128 includes a body 410 that is elongated along the longitudinal axis 152. The body 410 includes a generally curved rear portion 412 and flat front surface 414. Optionally, alternative contours, shapes and sizes may be utilized. The camera 118 is mounted in the body 410 and located at a central area of the front surface 414. The camera 118 is communicatively coupled to sensors 416-418 that collect various types of information in connection with performing three-dimensional scanning, gesture detection, capturing 2D and 3D still or video images, and other operations. The sensors 416-418 are distributed along the longitudinal axis 152 and positioned on opposite sides of the camera 118, although alternative sensor configurations may be utilized. One or more lights 420 are provided along the body 410 and may be turned on and off to facilitate collection of information by the camera 118. The light 420 may be utilized by the user to eliminate a desktop or an object being scanned. The light 420 may also be used as a flash in connection with taking 2-D or 3-D photographs in a dark environment.

A shutter 422 (denoted in dashed lines) is held within a slot within the body 410. The shutter 422 is positioned to cover and expose the camera 118. The shutter 422 is attached to a post 424 that slides along a slot 426 provided in the body 410. A user manually slides the post 424 along the slot 426 to open and close the shutter 422. Alternatively or additionally, shutters may be provided to cover and expose one or more of the sensors 416-418. Optionally, alternative shutter designs may be used. For example, the shutter(s) may be electronically controlled to open and close (e.g., based on operation of the camera).

The body 410 is elongated with a proximal end 428 and a distal end 430. Optionally, the proximal end 428 may include a grooved exterior surface to facilitate gripping by a user when tilting the camera 118 in a desired direction. A multi-action hinge 432 is provided at the proximal end 428 of the body 410. The multi-action hinge 432 couples the lever arm 128 to the main leg 124 (FIG. 1) in a manner that enables movement between the body 410 and main leg 124 along two or more paths. In the embodiment of FIG. 4, the hinge 432 enables the body 410 to pivot about leg longitudinal axis 150 and arm longitudinal axis 152 (both of which are also illustrated in FIG. 1). The lever arm 128 rotates along the pivot path 154 within a predetermined pivot range between pivot limits. The body 410 tilts/rotates along a swivel path 156 within a predetermined swivel range between swivel limits. The pivot and swivel limits may be varied and are set within the hinge 432. Optionally, the multi-action hinge 432 may be simplified to support movement in only one of the pivotal and swivel paths 154 and 156.

Figure 5A:
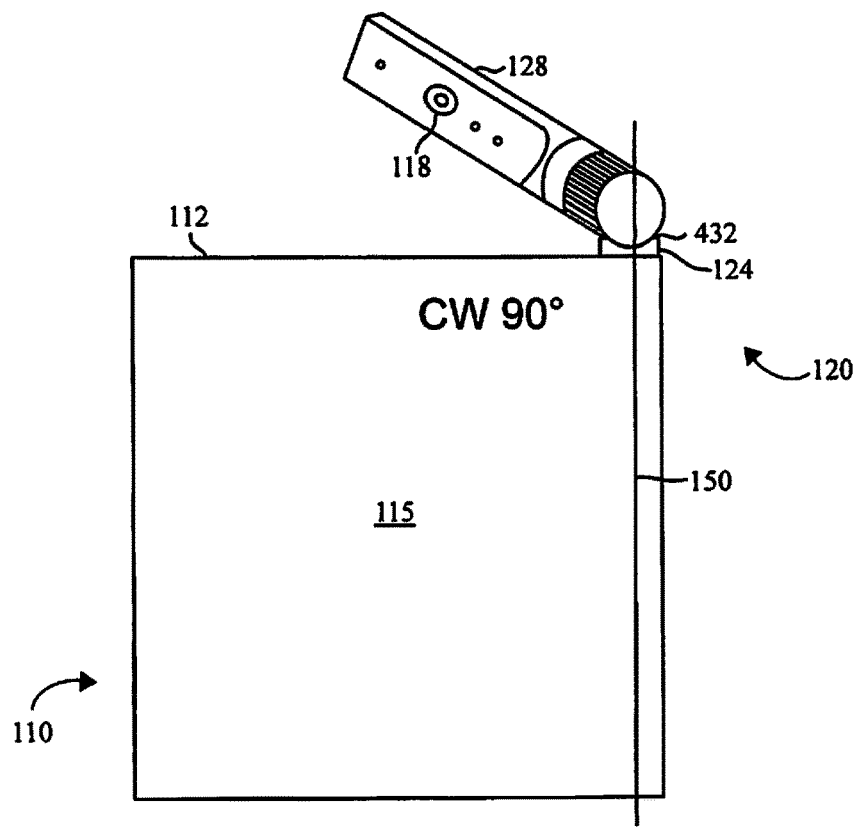
FIG. 5A illustrates graphical representations of different positions and orientations supported by the camera assembly in accordance with embodiments herein.
Figure 5B:
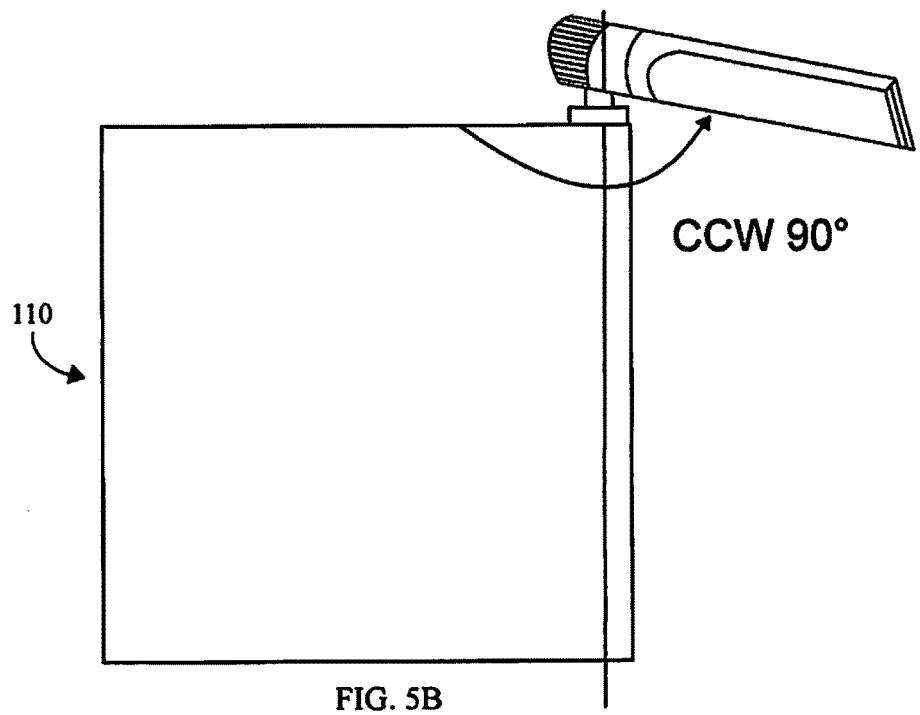
FIG. 5B illustrates the camera assembly with the main leg located behind the front face of the housing in accordance with embodiments herein.
Figure 5C:
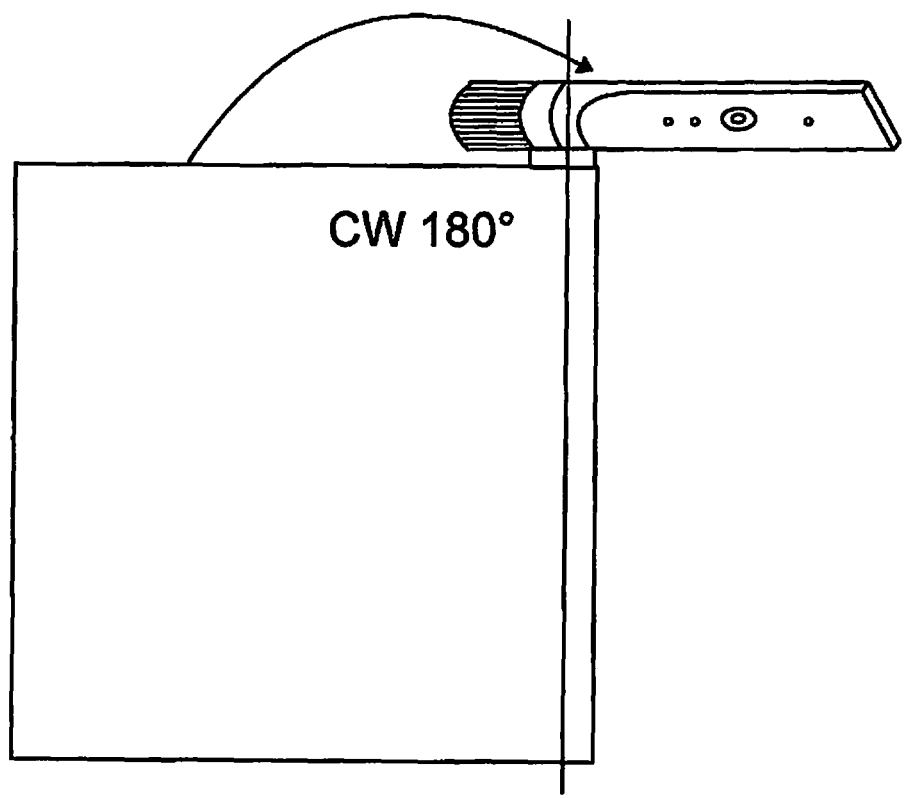
FIG. 5C illustrates the camera assembly with the main leg located behind the front face of the housing in accordance with embodiments herein.

FIGS. 5A-5C illustrates graphical representations of different positions and orientations supported by the camera assembly 120. It is recognized that FIGS. 5A-5C are only examples and the camera 118 may be located at any point along a continuous range of other positions and orientations. FIG. 5A illustrates the camera assembly 120 while the main leg 124 is located behind the front face 114 of the housing 112. In the example of FIG. 5A, the lever arm 128 is pivoted about the longitudinal axis 150 in an approximate 90° clockwise direction. The camera 118 is swiveled to face in a direction generally to the left of the housing 112 (the left and right directions a relative to a user sitting in front of the display 110 and facing the front face 114.). As one example, a pivot limit may be provided within the hinge 432 to prevent the lever arm 128 from being pivoted/rotated clockwise any further than the position shown in FIG. 5A, corresponding to at an approximate 90° clockwise angle (as viewed from the top down).

FIG. 5B illustrates the camera assembly 120 with the main leg 124 located behind the front face 114 of the housing 112. The lever arm 128 is pivoted in a counterclockwise direction until facing in a lateral direction, such as to the right of the display 110 (relative to a user sitting in front of the display 110 and facing the front face 114). For example, the lever arm 128 may be swiveled and a counterclockwise direction by approximately 90° from the plane of the front face 114.

FIG. 5C illustrates the camera assembly 120 with the main leg 124 located behind the front face 114 of the housing 112. The lever arm 128 is pivoted in a counterclockwise direction until facing in a lateral direction, such as to the right of the display 110 (relative to a user sitting in front of the display 110 and facing the front face 114). For example, the lever arm 128 may be swiveled and a counterclockwise direction by approximately 90° from the plane of the front face 114.

Figure 6A:
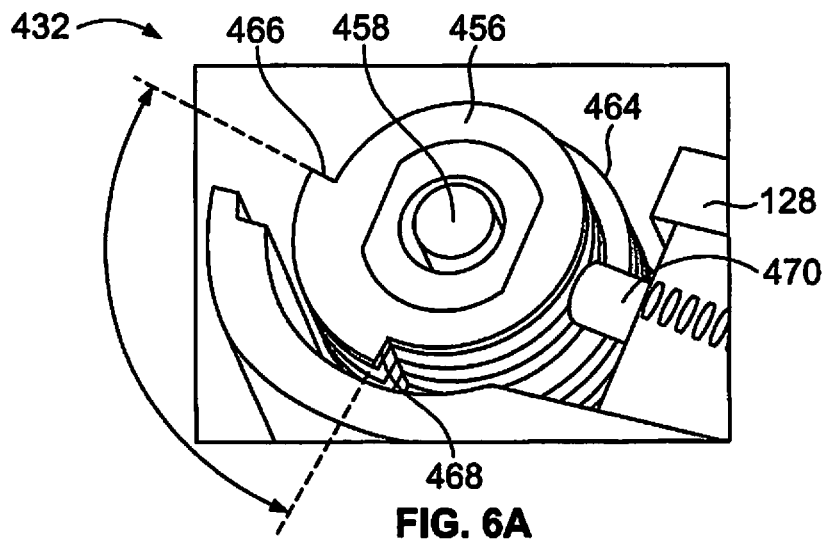
FIG. 6A illustrates perspective views of internal components of a multi-action hinge formed in accordance with embodiments herein.
Figure 6B:
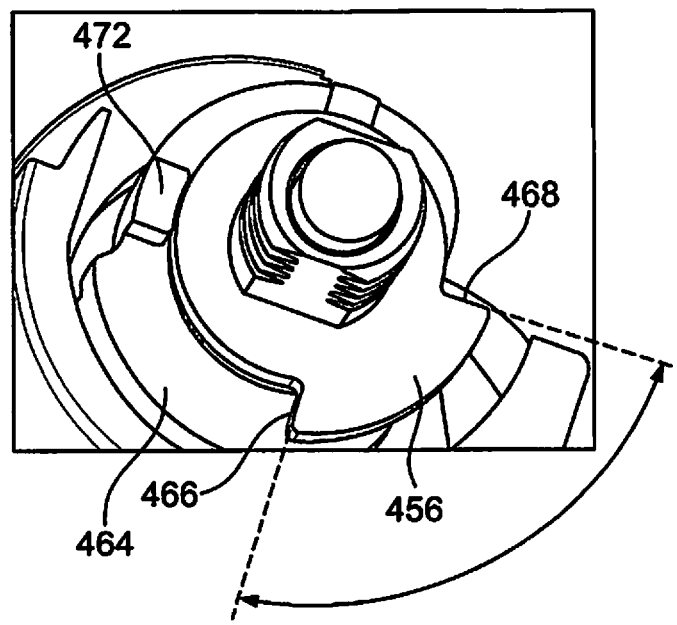
FIG. 6B illustrates a portion of the hinge in accordance with embodiments herein.

FIGS. 6A and 6B illustrate perspective views of internal components of a multi-action hinge 432 formed in accordance with embodiments herein. With reference to FIG. 6A, the hinge 432 is mounted on an end 464 of the main leg 124. A post 458 is formed integral with the main leg 124. A collar 456 is rotatably mounted over the post 458. The collar 456 is secured to a pin 470 that extends radially outward from one side of the collar 456. The pin 470 is coupled to a proximal end of the lever arm 128. The collar 456 rotates relative to the post 458 to enable the pivot motion discussed herein between the lever arm 128 and the main leg 124. The collar 456 includes notched ledges 466 and 468 that define pivot limits for the range of pivotal motion permitted by the hinge 432 between the lever arm 128 and main leg 124.

FIG. 6B illustrates a portion of the hinge 432 in accordance with embodiments herein. In FIG. 6B, a portion of the collar 456 is removed to illustrate other features of the hinge 432. A standoff 472 is mounted to the end 464 of the main leg 128. The standoff 472 is positioned to engage the notched ledges 466 and 468 on the collar 456 to define pivot limits associated with the pivot range that the lever arm 128 may be rotated/pivoted relative to the main leg 124.

Figure 7:
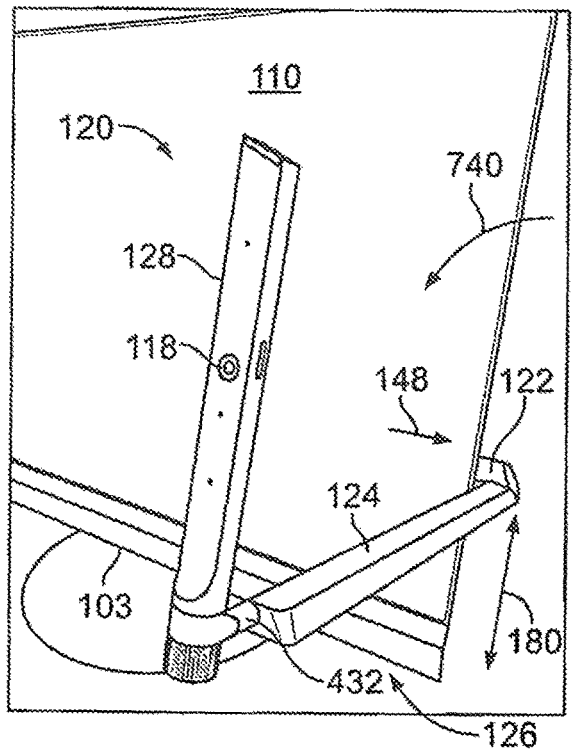
FIG. 7 illustrates a front side perspective view of the camera assembly in an example position and orientation in accordance with embodiments herein.

FIG. 7 illustrates a front side perspective view of the camera assembly 120 in an example position and orientation. To reach the position and orientation illustrated in FIG. 7, the articulating support 126 has been translated in the outward direction 148 until the main leg 124 clears the edge of the display. The main leg 124 is then rotated in the direction of arrow 740 until the main leg 124 is generally horizontal. The lever arm 128 is pivoted and swiveled such that the lever arm extends upward from the main leg 124, with the camera 118 oriented to have a field of view facing an area in front of the display 110. It may be desirable to position the camera 118 as illustrated in FIG. 7 for a variety of uses, such as in connection with videoconferencing, gesture detection and the like.

The base 122 is rotatably mounted a select height 180 above the bottom or lower edge 103 of the display 110. Optionally, the height 180 may be measured from the working surface on which the display 110 is mounted. The height 180 is selected such that, when the main leg 124 is in a generally horizontal alignment, the camera 118 be located in a desired, relatively close proximity to the workspace, and thereby facilitate 2-D or 3-D scanning or illumination of objects on the workspace. By way of example only, the height 180 may be approximately ⅓ of the overall height (as measured between the upper and lower edges 102 and 103) of the display 110.

Figure 8:
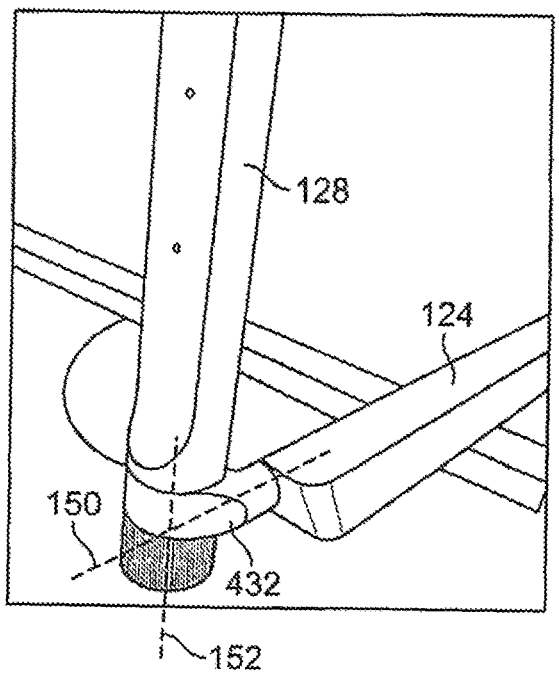
FIG. 8 illustrates a perspective view of the interconnection between the main leg and the lever arm, while positioned in oriented as illustrated in FIG. 7 in accordance with embodiments herein.

FIG. 8 illustrates a perspective view of the interconnection between the main leg 124 and the lever arm 128, while positioned in oriented as illustrated in FIG. 7. The hinge 432 has been rotated about the leg longitudinal axis 150 and pivoted about the arm longitudinal axis 152 to position and orient the camera as desired.

By way of example, the camera 118 may represent the REALSENSE 3D™ camera offered by Intel Corporation, and the application 924 may represent the software and/or firmware provided in connection with the REALSENSE 3D™ camera for performing 3D scanning and/or gesture detection. As another example, the camera 118 may represent the SPROUT™ camera offered by HP Corporation, and the application 924 may represent the software and/or firmware provided in connection therewith for performing 3D scanning. As a further example, the application 924 may implement gesture detection as described in U.S. Pat. No. 9,024,958, titled "Buffering mechanism for camera-based gesturing", issuing on May 5, 2015, the complete subject matter of which is expressly incorporated herein by reference in its entirety. The application 924 may include other conventional 3D scanning and gesture detection software.

Figure 9:
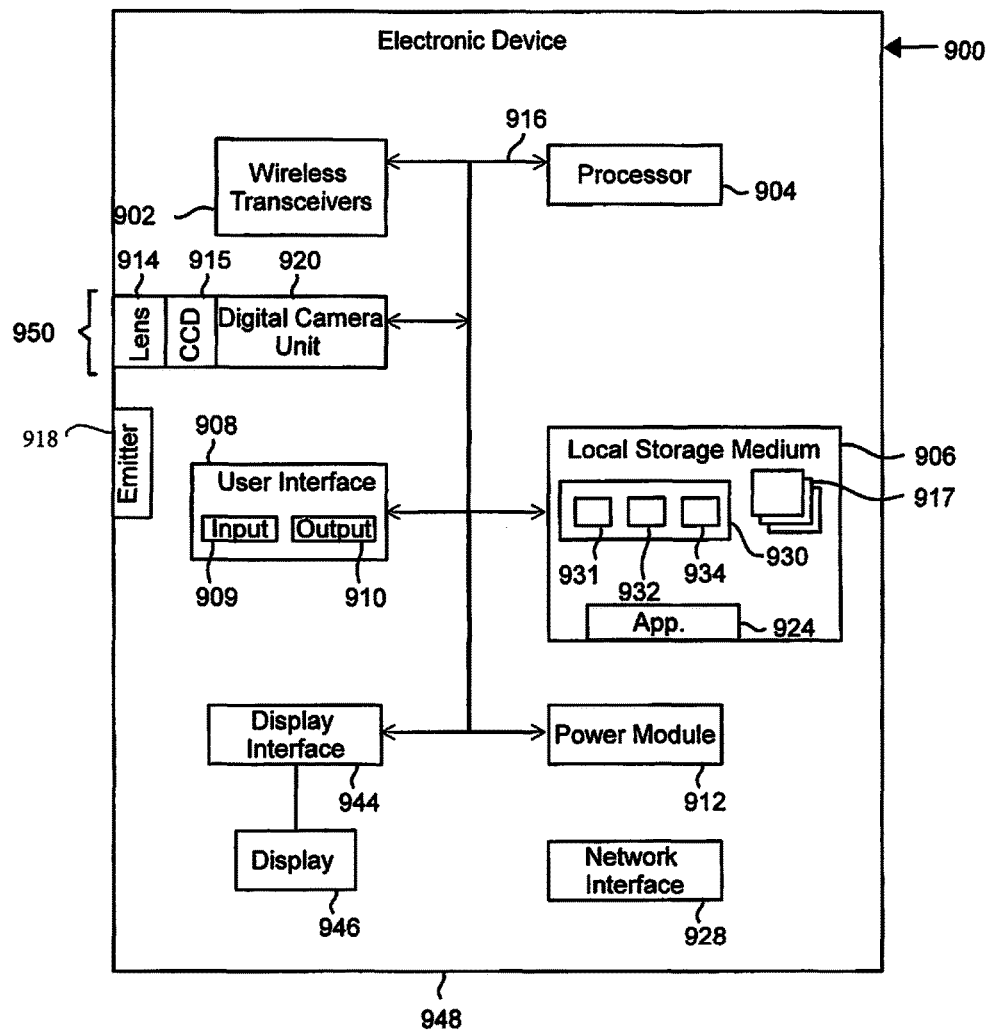
FIG. 9 illustrates a block diagram of an electronic device in accordance with embodiments herein.

FIG. 9 illustrates a block diagram of an electronic device 900 (e.g. computer monitor, television, a laptop computer, tablet devices, smart phone and the like), corresponding to electronic device 100, which includes components such as one or more wireless transceivers 902, one or more processors 904 (e.g., a microprocessor, microcomputer, application-specific integrated circuit, etc.), one or more local storage medium (also referred to as a memory portion) 906, a display 946, a user interface 908 which includes one or more input devices 909 and one or more output devices 910, a power module 912, a camera assembly 920, a display interface 944 and a network interface 928. The components can be operatively coupled to one another, and can be in communication with one another, by way of one or more internal communication links 916, such as an internal bus.

The processor 904 performs the disclosed operations by executing the sequences of operational instructions that comprise each computer program resident in, or operative on, the memory 906. The memory 906 may include operating system, administrative, and database programs that support the programs disclosed in this application.

The housing 948 of the electronic device 900 holds the processor(s) 904, local storage medium 906, user interface 908, the camera assembly 950 and other components. The camera assembly 950 collects data in connection with one or more viewer characteristics of interest (COI). The camera assembly 950 may represent a 2D or 3D still or video camera that collects still or video image frames. A lens 914 is optically and communicatively coupled to the camera assembly 950. The lens 914 may be mounted at various locations on the housing 912. Optionally, multiple lenses 914 may be positioned at various distributed positions within, or about the perimeter of the housing 912. The camera assembly 950 may represent various types of 2-D or 3-D still or video cameras, detection units and the like. The camera assembly 950 may be utilized in connection with various modes of operation, such as 2-D or 3-D scanning, gesture detection and the like. The camera assembly 950 may further include a lens 914 and one or more detectors 915, such as a charge coupled device (CCD). The detector 915 may be coupled to a local processor (e.g., digital camera unit 920) within the camera assembly 950 that analyzes image frame data captured. The camera assembly 950 may include one or multiple combinations of detectors and lens. For example, an array of two or more detector/lens combinations may be spaced apart from one another. When multiple detectors/lens are used, each detector/lens combination may be oriented in at least partially different directions, such that the fields of view of the respective detector/lens combinations encompass different areas.

Additionally or alternatively, the camera assembly 950 may collect data related to a field of view other than image frames. For example, the camera assembly 950 may represent one or more infrared (IR) light emitting diode (LED) based-camera devices. For example, one or more IR-LED emitters 918 may be used to illuminate the field of view with one or more select wavelengths of light (e.g., 880 nm). A high pass filter (HPF) element may be located with the lens 914 such that the HPF element passes infrared light with a select wavelength (e.g., 800 nm). The IR-LED emitter 918 and detector 915 represent one type of camera that collects data related to a field of view.

It is recognized that the camera assembly 950 may be housed within any of the various articulating supports described and illustrated herein, including an entirely detachable articulating support as illustrated herein.

The input and output devices 909, 910 may each include a variety of visual, audio, and/or mechanical devices. For example, the input devices 909 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 910 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 910 may include a touch sensitive screen, a non-touch sensitive screen, a text-only display, a smart phone display, an audio output (e.g., a speaker or headphone jack), and/or any combination thereof. The user interface 908 permits the user to select one or more of a switch, button or icon in connection with normal operation of the electronic device 900.

The local storage medium 906 may encompass one or more memory devices of any of a variety of forms (e.g., read only memory, random access memory, static random access memory, dynamic random access memory, etc.) and can be used by the processor 904 to store and retrieve data. The data that is stored by the local storage medium 906 can include, but need not be limited to, operating systems, applications, streaming video content, resolution maps, viewer COIs, display attributes and informational data. Each operating system includes executable code that controls basic functions of the communication device, such as interaction among the various components, communication with external devices via the wireless transceivers 902, the network interface 928 and/or the display component interface 914, and storage and retrieval of applications and data to and from the local storage medium 906. Each application includes executable code that utilizes an operating system to provide more specific functionality for the communication devices, such as file system service and handling of protected and unprotected data stored in the local storage medium 906.

The local storage medium 906 stores various content, including but not limited to video content 917, one or more still images, viewer characteristics of interest 930 such as viewing distance 931, position data 932, line of sight (LOS) data 934, lighting level, and the like. The video content 917 may represent various types of graphical and video content including audio content.

Other applications stored in the local storage medium 906 include various application program interfaces (APIs). Additionally, the applications stored in the local storage medium 906 include a scanning application 924 representing program instructions that direct one or more processors to 2-D or 3-D scanning, gesture detection and the like. For example, when the lens is located below the line of sight, the images may, if left uncorrected, present a bottom-up view of a user's chin and nose. The application 924 may perform image processing upon the images as collected to shift the perspective of the view upward such that the users chin and nose are not as noticeable. The application 924 includes program instructions accessible by the processor 904 to direct the processor 904 to implement the methods, processes and operations described herein.

In accordance with embodiments herein, the application 924 may identify facial features, eye movement, line of sight of the eyes and the like. In connection with gesture detection, the camera assembly 950 collects a series of image data frames 930 associated with the scene over a select period of time. For example, the camera assembly 950 may begin to capture the image data frames 930 when the application 924 senses movement of the room. Image frame data 930 may be collected for a predetermined period of time, for a select number of frames or based on other data collection criteria. For example, the camera assembly 950 may include capturing image frame data which may represent a viewer's face with the camera, hands, objects, from which movement is calculated utilizing the processor.

The processor 904, under control of the application 924, analyzes one or more image data frames 930, to perform various desired operations. Optionally, the processor 904, under the control of the application 924, may determine the line of sight associated with one or more viewers, such as to identify who is watching a television. The LOS data 934 may represent a gaze direction vector defined with respect to a coordinate system. For example, the gaze direction vector may be defined with respect to a polar coordinate system, where a reference point and origin of the polar coordinate system are located at a known position.

The power module 912 preferably includes a power supply, such as a battery, for providing power to the other components while enabling the electronic device 900 to be portable, as well as circuitry providing for the battery to be recharged. The component interface 914 provides a direct connection to other devices, auxiliary components, or accessories for additional or enhanced functionality, and in particular, can include a USB port for linking to a user device with a USB cable.

Each transceiver 902 can utilize a known wireless technology for communication and receiving wireless streaming video content. Exemplary operation of the wireless transceivers 902 in conjunction with other components of the electronic device 900 may take a variety of forms and may include, for example, operation in which, upon reception of wireless signals, the components of electronic device 900 detect communication signals and the transceiver demodulates the communication signals to recover incoming information, such as video content, transmitted by the wireless signals.

It should be clearly understood that the various arrangements and processes broadly described and illustrated with respect to the FIGS., and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Aspects are described herein with reference to the FIGS., which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device, comprising:
   a display provided in a housing;
   a retention bracket provided on the housing of the display, the retention bracket including a cavity that defines a translation path and a rotational path; and
   a camera assembly including a camera and an articulating support that includes a base and a main leg, the base to slide within the cavity along the translation path defined by the cavity in the retention bracket, the main leg joined to the base in a manner to rotate about the rotational path defined by the cavity in the retention bracket, wherein the translation path and the rotational path form camera alignment paths followed by the camera in association with the camera moving between a retracted position and active positions.

2. The electronic device of claim 1, wherein the cavity defines the rotational path such that the main leg is located at least partially behind the display proximate a back wall of the housing when in the retracted position.

3. The electronic device of claim 1, wherein the base is elongated along a base longitudinal axis and is held in the cavity provided in the base retention bracket and wherein the base slides within the cavity along the translation path, corresponding to the longitudinal axis, between i) a retracted position within the cavity and ii) an extended position projecting from the cavity and beyond an edge of the housing, the translation path representing one of the alignment paths.

4. The electronic device of claim 3, wherein the cavity defines the translation path such that the main leg is located proximate to a back wall of the housing when the base is in the retracted position within the cavity and the main leg is located laterally outward from an edge of the housing when the base is in the extended position.

5. The electronic device of claim 1, wherein the display is positioned within and defines a display plane that includes the display, wherein the base slides along the translation path until the main leg clears an edge of the display and wherein the main leg rotates along the edge of the display through the display plane when following the rotational path.

6. The electronic device of claim 1, wherein the articulating support further comprises an upper lever arm coupled to the main leg by a hinge that defines a pivot path having a range of motion that at least partially crosses in front of a front face of the display, the pivot path representing one of the alignment paths, the pivot path rotating about a pivot axis extending along a length of the main leg.

7. The electronic device of claim 6, wherein the hinge includes a multi-action hinge that rotates the lever arm relative to the main leg about the pivot path, the multi-action hinge tilting the camera about a swivel path, the swivel path rotation about a swivel axis that extends along a length of the extension arm, the swivel path representing one of the alignment paths.

8. The electronic device of claim 1, wherein the camera comprises a 3D camera.

9. The electronic device of claim 8, further comprising memory and one or more processors coupled to the camera, wherein the one or more processors execute program instructions stored in the memory to perform a 3D scanning operation of an object of interest in a field of view of the 3D camera.

10. The electronic device of claim 8, further comprising memory and one or more processors coupled to the camera, wherein the one or more processors execute program instructions stored in the memory to perform gesture detection of an object of interest in a field of view of the 3D camera.

11. The electronic device of claim 1, wherein the articulating support moves the camera between active positions that include one or more of:
   i) a birds eye view in which the main leg is oriented in a generally horizontal direction or approximately perpendicular relative to a front face of the display,
   ii) a frontal scene view in which the main leg is oriented in a generally vertical or common direction with the front face of the display,
   iii) an intermediate position to provide an overview in which the main leg is oriented at an intermediate angle relative to the front face of the display.

12. A method comprising:
   providing an electronic device having a housing with a display therein, the electronic device comprising a camera assembly including a camera and an articulating support that includes a base and a main leg joined to the base;
   providing a cavity in the housing of the display, wherein the cavity defines a translation path and a rotational path as camera alignment paths;
   movably coupling the base to slide within the cavity along the translation path defined by the cavity; and
   movably coupling the main leg to rotate about the rotational path defined by the cavity, wherein the base to slide along the translation path and the main leg to rotate about the rotational path in association with the camera moving between a retracted position and active positions.

13. The method of claim 12, wherein the cavity defines the rotational path such that the main leg is located at least partially behind the display when in the retracted position.

14. The method of claim 12, wherein the base is elongated along a base longitudinal axis, the method further comprising holding the base in the cavity provided in the housing wherein the base slides within the cavity along the translation path, corresponding to the longitudinal axis, between i) a retract position within the cavity and ii) an extended position projecting from the cavity, the translation path representing one of the alignment paths.

15. The method of claim 12, further comprising locating the main leg proximate to a back wall of the housing when the base is in the retracted position within the cavity and locating the main leg laterally outward from an edge of the housing when the base is in the extended position.

16. The method of claim 12, further comprising moving the articulating support along a rotational path that traverses a display plane defined by the display, the rotational path representing one of the alignment paths.

17. The method of claim 12, further comprising movably coupling an upper lever arm to the main leg to define a pivot path having a range of motion that at least partially crosses in front of a front face of the display, the pivot path representing one of the alignment paths, the pivot path rotating about a pivot axis extending along a length of the main leg.

18. The method of claim 17, wherein the upper lever arm is coupled to the main leg in a manner that enables rotation of the lever arm relative to the main leg about the pivot path, and enables tilting the camera about a swivel path, the swivel path rotation about a swivel axis that extends along a length of the upper lever arm, the swivel path representing one of the alignment paths.

19. The method of claim 12, further comprising performing a 3D scanning operation of an object of interest in a field of view of the camera.

20. The method of claim 12, wherein the camera alignment paths support movement of the camera between active positions that include one or more of:

i) a birds eye view in which the main leg is oriented in a generally horizontal direction or approximately perpendicular relative to a front face of the display, ii) a frontal scene view in which the main leg is oriented in a generally vertical or common direction with the front face of the display, iii) an intermediate position to provide an overview in which the main leg is oriented at an intermediate angle relative to the front face of the display.

21. An electronic device, comprising:

a housing;

a display provided within the housing, the housing of the display including a cavity that defines a translation path and a rotational path;

a camera assembly including a camera and an articulating support that includes a base and a main leg joined to the base, the base to slide within the cavity along the translation path defined by the cavity, the main leg joined to the base in a manner to rotate about the rotational path defined by the cavity, wherein the translation path and the rotational path form camera alignment paths followed by the camera in association with the camera moving between a retracted position and active positions; and memory and one or more processors provided within the housing and coupled to the camera, wherein the one or more processors execute program instructions stored in the memory to perform operations of an object of interest in a field of view of the camera.

* * * * *